United States Patent [19]

Augstkalns

[11] 3,937,686

[45] Feb. 10, 1976

[54] PROCESS OF PREPARING HIGH MOLECULAR WEIGHT POLYAMIDE WITH RECOVERY OF DIAMINE AND RETURN OF SAME TO POLYMERIZATION SYSTEM

[75] Inventor: Valdis Ansis Augstkalns, Parkersburg, W. Va.

[73] Assignee: c/o E. I. Du Pont de Nemours & Co., Wilmington, Del.

[22] Filed: Jan. 10, 1974

[21] Appl. No.: 432,172

[52] U.S. Cl. .............................. 260/78 R; 260/95 R
[51] Int. Cl.$^2$.......................................... C08G 69/28
[58] Field of Search ................................... 260/78 R

[56] References Cited
UNITED STATES PATENTS

| | | | |
|---|---|---|---|
| 2,908,666 | 10/1959 | Notarbartolo...................... | 260/78 R |
| 3,296,217 | 1/1967 | Tate.................................... | 260/78 R |
| 3,402,152 | 9/1968 | Brignac et al...................... | 260/78 R |

OTHER PUBLICATIONS

Calmon et al. Ion Exchangers In Organic and Biochemistry, 1957, pp. 423, 653.

Primary Examiner—Harold D. Anderson

[57] ABSTRACT

In the preparation of high molecular weight polyamides, vaporization of the organic diamine employed results in its loss. The effect of the loss can be reduced by collecting the vapor given off during the evaporation and/or polymerization steps, condensing it, passing the condensate through a selected ion-exchange resin, and obtaining the diamine by contacting the resin with either a strong inorganic acid or an aqueous solution of an organic dicarboxylic acid used in making high molecular weight polyamides depending upon the resin employed. When the diacid is used, the salt so obtained can be used in preparing high molecular weight polyamides.

7 Claims, No Drawings

PROCESS OF PREPARING HIGH MOLECULAR WEIGHT POLYAMIDE WITH RECOVERY OF DIAMINE AND RETURN OF SAME TO POLYMERIZATION SYSTEM

FIELD OF THE INVENTION

This invention is directed to the recovery of the organic diamine usually lost during the concentration of and the reaction of the diamine in preparing polyamides.

BACKGROUND OF THE INVENTION

In the condensation reaction for producing polyamide resin or fiber by polymerizing a salt of an organic diamine with an organic diacid, water is formed. Water is also present in the reaction apparatus from the water used to dissolve the initial reactants. In order for the reaction to proceed smoothly, this water must be removed. While the water, in form of steam, is being removed and vented from the evaporation and reaction apparatus, a part of the organic diamine present is inevitably lost through being carried along with the steam. It would be desirable to recover this lost diamine.

Various procedures exist in the art for the removal of organic diamines from aqueous solutions, such as removal by sorption with charcoal or by molecular sorption on an anion exchange resin of a polymeric alkenylaromatic resin crosslinked with a dialkenyl crosslinking agent as described in Sargent, U.S. Pat. No. 3,159,632. However, these procedures do not leave the removed diamine in a form practical for direct reuse, especially reuse in the polymerization process. This invention is directed to a process in which the organic diamine is not only removed, but is also regenerated in a salt form in which it can be directly employed in a variety of uses depending upon the acid used to form the salt.

SUMMARY OF THE INVENTION

In the process for preparing a high molecular weight polyamide from an aqueous solution of a polyamide-forming salt of an organic diamine and an organic dicarboxylic acid wherein the salt is concentrated and polymerzied, during which steam is vented from the evaporation and polymerization equipment; the improvement which comprises in sequence 1. collecting and condensing vented vapor,
2. contacting the condensate of the vented vapor with the hydrogen form of a resin selected from the class consisting of carboxylic, phosphonic and sulfonic ion-exchange resins, which resin has a strength sufficient to recover said organic diamine from an aqueous solution thereof,
3. contacting the resin employed in step 2 with, when the resin is a carboxylic ion-exchange resin, either a strong inorganic acid or an organic dicarboxylic acid of the type employed in making high molecular weight polyamides, or, when the resin is a phosphonic or sulfonic ion-exchange resin, a strong inorganic acid, and
4. collecting the aqueous solution obtained in step 3.

In a preferred embodiment, the resin will be a carboxylic ion-exchange resin and the acid used in step 3 will be the organic dicarboxylic acid and the liquid from step 4 will be added to the solution in the polymerization equipment.

DESCRIPTION OF THE INVENTION

By the process of this invention, organic diamines can be recovered from the steam vented during polyamide salt evaporation and polymerization prior to passing the steam effluent (condensed) into waste streams.

In the preparation of high molecular weight polyamides, i.e., fiber-forming or moldable polyamides, an aqueous salt solution, e.g., a salt solution of hexamethylene diamine and adipic acid, is usually heated in an evaporator to volatilize solvent water and concentrate the salt. Ordinarily, the evaporator will be operated at a temperature just above the boiling point of water, e.g., 105°C. to about 175°C. and under slight pressure, e.g., 1–5 atmospheres. The concentrated salt from the evaporator is then transferred to continuous or batch polymerization equipment where initial polymerization takes place. It is during removal of water from the evaporator and from the initial polymerization equipment that most diamine loss occurs. In some polymerization processes, the evaporator step is eliminated and this increases diamine loss since more water must be boiled off during the initial polymerization reaction. Operating conditions in the initial polymerization equipment can involve heatup of the salt from inlet temperatures as low as 45°C. (no evaporator employed) to 200°C. to 320°C. depending on the type of polyamide being prepared. Operating pressures range from 180 psig to 600 psig or more.

After initial polymerization, the initially prepared polyamide, which still contains water, is passed through apparatus in which the operating pressure is reduced to atmospheric pressure or less. In a batch process, this is accomplished by controlling venting of water; and in a continuous process, by passage through pipes or other devices for producing controllable pressure drop via fluid flow phenomena.

In a continuous process, the initially polymerized mass is forwarded to a separator where dissolved water and water produced in the condensation reaction is removed in the form of vapor. During both pressure reduction and in the separator, operating temperatures range from slightly above the melting point of the polyamide to about 320°C. Pressure in the separator is from slightly above 1 atmosphere to as low as about 50 mm. of mercury. The molten polyamide is then moved to finishing vessels to further polymerize the mass and to adjust the molecular weight of the polyamide. Finishers are normally operated at less than atmospheric pressure, e.g., about 50–700 mm. of mercury and at temperatures from slightly above the melting point of the polyamide to about 320°C. From the finisher, the molten polyamide is forwarded through transfer lines and is extruded into the atmosphere.

In a batch process, after the pressure is reduced in the polymerization equipment, the molten polyamide is held at pressures from about 50 to 760 mm. of mercury and temperatures from slightly above the melting point to about 320°C. until the desired molecular weight is achieved. Very little steam is vented during this period. The autoclave is then pressurized with inert gas and the polymer extruded into the atmosphere.

In the improvement described herein, organic diamine appearing in the steam vented during concentration of the salt and/or during polymerization can be recovered and reused. The steam vented from the evaporator or the initial polymerization apparatus ordinarily contains a much greater quantity of diamine than the steam vented from later polymerization apparatus used in the process. A typically condensed vapor from the evaporator or initial polymerization reactor will contain between about 0.05–3% by weight organic diamine.

The vented steam, containing the diamine, is first condensed into liquid form. The liquid usually contains other impurities such as entrained salt and/or low molecular weight polyamide and degradation products. Solids can be removed by filtration, if desired, especially if the condensate is to be passed down through an ion-exchange column. On the other hand, if the condensate is to be passed upward through an ion-exchange column, the solids need not be filtered out. In either upward or downward flow the condensate is contacted with the hydrogen form of the cation exchange resin. Upward flow is preferred herein.

The resin is regenerated to the hydrogen form, and the diamine converted to salt form simply by contacting the resin (containing the diamine) with either a strong inorganic acid, or an organic dicarboxylic acid that can be used to form high molecular weight polyamides if the resin is a carboxylic ion-exchange resin.

The dicarboxylic acid employed can be the same diacid used initially to form the salt used in the polymerization process, and in this instance, the salt obtained after contact with the ion-exchange resin can then be added to the evaporator or to the initial polymerization apparatus to complete the recycling of the diamine. However, the dicarboxylic acid employed may be a different acid than the acid employed initially. In such an instance, the salt product can be stored until it is desired to make a polyamide in which the acid desired for use is the acid used in the process of this invention.

The resin can be regenerated with the acid in a variety of ways known in the art. For example, an aqueous solution of the acid can be passed through a column containing the resin, or the resin can be added to the acid solution in a vessel, and, after mixing, the resulting liquid can be decanted or filtered. Alternatively, the acid can be added in solid form, if an organic diacid, to an aqueous mixture containing the resin.

In addition to obtaining a diamine salt that can be reused in a polyamide polymerization process, it is recognized that the water effluent from the ion-exchange system is of good quality, and can, with treatment, e.g., activated carbon and ion-exchange, be converted to high purity water which can also be reused in the process.

Any diamine which can react with an organic diacid to form a high molecular weight polyamide can be employed in the process of this invention. Representative organic diamines include hexamethylene diamine, octamethylene diamine, dodecylmethylene diamine, m- or p-phenylene diamine, and generally any alkylene or aryl diamine having 4—13 carbon atoms and having the amine groups on non-adjacent carbon atoms.

Representative organic dicarboxylic acids include adipic acid, sebacic acid, dodecanedioic acid, and generally any alkylene dicarboxylic acid having 4–13 carbon atoms and having the carboxyl groups on non-adjacent carbons.

Preferably the acid and amine functional groups will be on terminal carbons in the diacid or diamine molecule.

Representative strong inorganic acids include nitric, sulfuric, phosphoric, and hydrochloric acid. When the acid is sulfuric, nitric, or phosphoric, the salt obtained may be used in fertilizer applications.

The cation-exchange resin is preferably a weakly acidic cation-exchange resin having carboxylic functionality, and most preferably an acrylic or methacrylic cation-exchange resin. Such resins include, e.g., "Amberlite" IRC-50, "Amberlite" IRC-72, "Amberlite" IRC-84, and the like.

The process of the invention is described in further detail in the following Example, which is not to be considered as limiting the invention.

EXAMPLE

Steam, vented from an initial polyermization reactor in use in a continuous polyamide polymerization process wherein a salt of hexamethylene diamine and adipic acid is being polymerized was collected and condensed. The condensate had a pH of between 11.42 and 11.51 and contained about 0.3 weight percent hexamethylene diamine. Twenty-three liters of said condensate were run through a 150 gm. (dry basis) bed of a methacrylic ion-exchange resin (Amberlite IRC-50) in a 1000 ml. burette. By measuring the pH of the effluent, it was found that the resin became saturated with hexamethylene diamine after about 21 liters of condensate had been passed through (after the entire 23 was passed through the effluent pH had risen to about 10.2). Bed volume increased about 47%.

The saturated resin was flushed with distilled water and the resin then decanted into a 2000 ml. beaker. 100 Gm. of adipic acid in about 500 ml. $H_2O$ was added as a partially dissolved slurry. After 45 minutes agitation the resin was filtered off and 1190 cc. of hexamethylene diamine/ adipic acid salt solution of 10.1 weight percent concentration and pH of about 5 was obtained. This salt was made up of about 78.4 gm. of adipic acid and about 42.2 gm. of hexamethylene diamine. 22.2 Gm. of pure hexamethylene diamine was added to adjust the salt end group balance near the neutral point.

A control salt solution was prepared by adding 75 gm. of adipic acid and 59.6 gm. of hexamethylene diamine in 1000 ml. of water.

A UV absorbance spectrum of each salt indicates that some impurities are present in the ion-exchange obtained salt. These impurities may be oxidized hexamethylene diamine and/or hexamethylene imine. Presence of the latter could account for the end group imbalance. However, presence of impurities does not affect the use of the salt in making polyamide except in yield and/or color.

Both salt solutions were filtered, evaporated with steam in a rotary vacuum evaporator, and dried in a nitrogen purged vacuum oven overnight at 70°C. The salts were then polymerized in sealed tubes. In the polymerization of the control salt, heat up from about 235°C. to about 265°C. took place in about 60 minutes and the salt was held at about 265°C. for about 90 minutes. In the polymerization of the ion-exchange-obtained salt, heat up from about 230°C. to about 265°C. took place in about 65 minutes and the salt was held at between about 265°–270°C. for about 90 minutes.

Properties of the polyamides so produced were as follows:

|  | From Control Salt | From Ion Exchange Obtained Salt |
|---|---|---|
| Relative Viscosity (RV) | 10.7 | 8.7 |
| —COOH ends/10⁶ gm. polymer | 268.5 | 434 |
| —NH₂ ends/10⁶ gm. polymer | 175.5 | 175 |
| Difference of Ends | 93 | 259 |
| DTA peaks | | |
| Melting point, °C. | 256 | 257 |
| Freeze point, °C. | 227 | 226 |

Relative Viscosity (RV) is conventionally defined as the ratio of absolute viscosity of an 8.4 weight percent polyamide solution in 90% formic acid to the absolute viscosity of the 90% formic acid solution at 25°C. For small size samples, as in these experiments, the relative viscosity of a 0.42% weight polyamide solution was measured and converted to the conventional RV by the following empirically developed correlation for 66 nylon:

$$\log_{10}(RV_{8.4} wt.\%) = 4.47 \log_{10}(RV_{0.42} wt.\%) + 0.683.$$

The molecular weight of the polyamide produced from the ion-exchange obtained salt (measured by relative viscosity) was slightly lower than the control because of greater end group imbalance.

The salt obtained from the ion-exchange procedure can be added to the evaporator or to the initial polymerization reactor or returned to the salt preparation facility to provide a continually recycled source of hexamethylene diamine.

An acrylic cation-exchange resin, such as Amberlite IRC-84, can also be employed in place of the methacrylic resin used in the Example. In addition, a strong inorganic acid may be used to regenerate the resin in place of the organic diacid.

The preceding representative example may be varied within the scope of the disclosure herein, as understood and practiced by one skilled in the art, to achieve substantially the same results.

The foregoing detailed description has been given for clearness of understanding only and no unnecessary limitations are to be understood therefrom. The invention is not limited to the exact details shown and described for obvious modifications will occur to those skilled in the art.

The embodiments of the invention in which an exclusive property or privilege is claimed are defined as follows:

1. In the process for preparing a fiber-forming or moldable polyamide from an aqueous solution of a polyamide-forming salt of an organic diamine and an organic dicarboxylic acid wherein the salt is concentrated and polymerized, during which steam and organic diamine are vented from the evaporation and polymerization equipment; the improvement which comprises in sequence
   1. collection and condensing vented vapor to form an aqueous solution of organic diamine condensate,
   2. contacting the condensate of the vented vapor with the hydrogen form of a carboxylic cation-exchange resin which has a strength sufficient to recover said organic diamine from an aqueous solution thereof,
   3. contacting the resin employed in step (2) with an organic dicarboxylic acid of the type employed in making said polyamide to form an aqueous solution of organic diamine-organic dicarboxylic acid salt,
   4. collecting the aqueous solution obtained in step (3), and
   5. adding the solution from step (4) to the salt preparation facility of said polymerization equipment.

2. The process of claim 1 wherein the vented vapor is obtained from a continuous process for preparing polyamide.

3. The process of claim 2 wherein said acid is adipic acid.

4. The process of claim 3 wherein the organic diamine employed is hexamethylene diamine.

5. The process of claim 1 wherein the vented vapor is obtained from a batch process for preparing polyamide.

6. The process of claim 5 wherein said acid is adipic acid.

7. The process of claim 6 wherein the organic diamine employed is hexamethylene diamine.

* * * * *